No. 667,995. Patented Feb. 12, 1901.
W. H. SCHROEDER.
APPLE PICKER.
(Application filed Apr. 19, 1900.)
(No Model.)
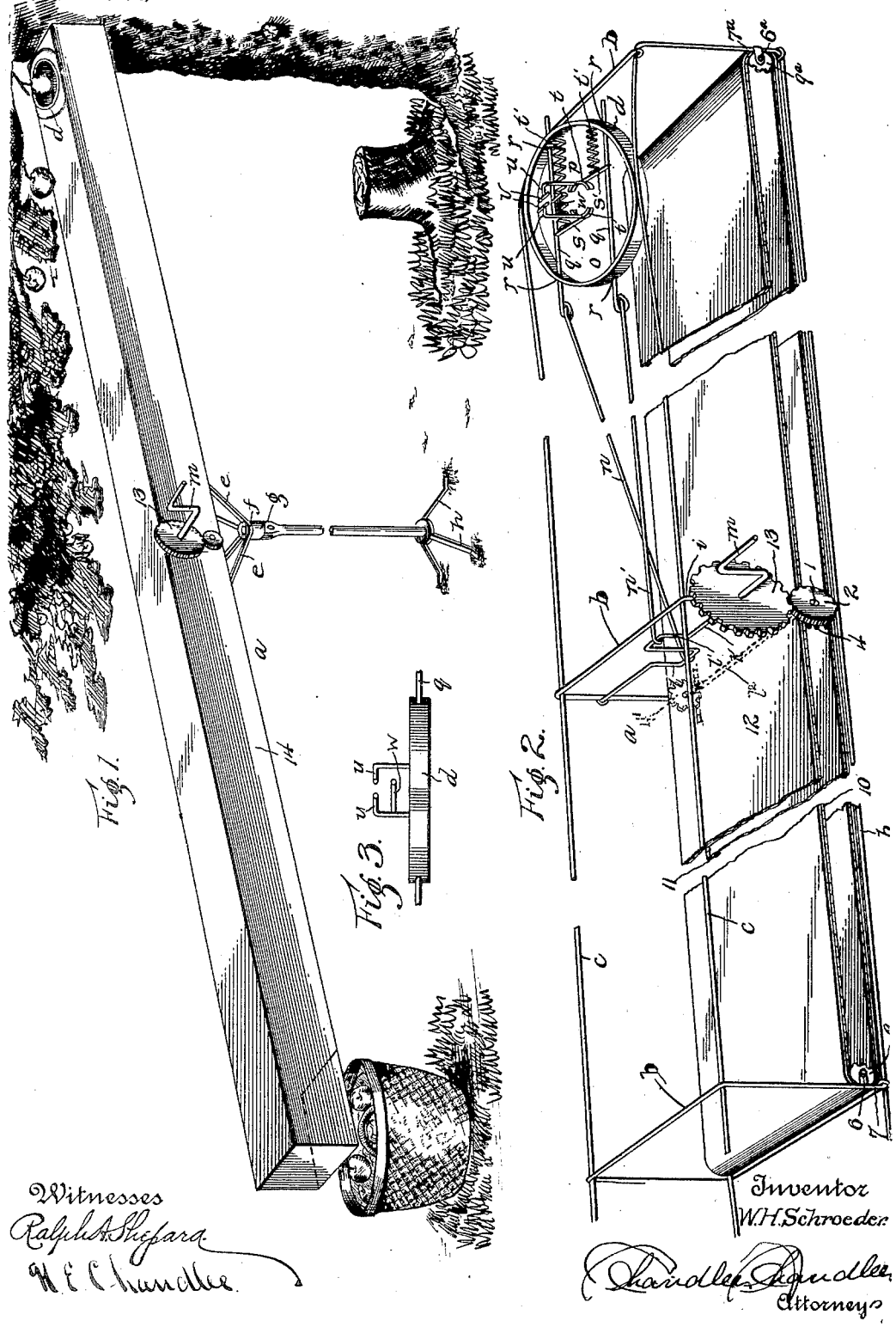
Witnesses
Ralph A. Shepard
H. E. Chandler
Inventor
W. H. Schroeder
Chandler & Chandler
Attorneys
THE NORRIS PETERS CO., PHOTO-LITHO., WASHINGTON, D. C.

UNITED STATES PATENT OFFICE.

WILLIE H. SCHROEDER, OF CRESTON, IOWA.

APPLE-PICKER.

SPECIFICATION forming part of Letters Patent No. 667,995, dated February 12, 1901.

Application filed April 19, 1900. Serial No. 13,523. (No model.)

*To all whom it may concern:*

Be it known that I, WILLIE H. SCHROEDER, a citizen of the United States, residing at Creston, in the county of Union, State of Iowa, have invented certain new and useful Improvements in Apple-Pickers; and I do hereby declare the following to be a full, clear, and exact description of the invention, such as will enable others skilled in the art to which it appertains to make and use the same.

My invention relates to fruit-gatherers in general, and more particularly to that class employed for picking apples, pears, &c.; and it has for one object to provide a device of this nature which shall be simple of construction and which will permit of fruit being picked and carried to the ground in such a manner as to avoid its being bruised or otherwise injured; and a further object is to provide a picker which may be operated from the ground, thereby avoiding the necessity of a ladder or of climbing into the tree bearing the fruit. With these objects in view I construct a device of this nature such as is shown in this specification and shown in the accompanying drawings, in which—

Figure 1 is a perspective view of my invention when in use. Fig. 2 is a view showing the invention with the cover removed. Fig. 3 is a detail view showing the picking mechanism.

In the manufacture of my invention I construct a rectangular frame $a$, comprising a series of rectangular braces $b$, connected at their corners by rods $c$, and at one end of the frame $a$ is a ring $d$. The entire frame is supported by a number of rods $e$, which are brought downwardly to meet a support $f$, to which they are attached. The support $f$ is divided, the two resultant portions being connected by a swivel $g$. Secured to the lower part of the support $f$ are a number of feet $h$, adapted to rest upon the ground. Mounted transversely of a rectangular brace $i$ is a shaft $k$, which is bent at its center to form cranks $l$ and $l'$, and upon one end of this shaft is secured a handle $m$, through the medium of which it may be revolved. Secured to the cranks $l$ and $l'$ are wires $n$ and $n'$, respectively, which terminate at the ring $d$, at which point they are secured to the picking mechanism.

The picking mechanism comprises two elements $o$ and $p$, each of which comprises a rod $q$, slidably mounted in perforations $r$, formed in the ring $d$. Projecting at right angles to each of the rods $q$ and transversely of the ring $d$ are arms $s$ and $s'$, upon the outer ends of which are arc-shaped jaws $t$. Connected to the arm $s'$ and to the ring $d$ is a spring $t'$, which imparts motion to the said arm. Projecting upwardly from each of the jaws $t$ at right angles to the arms $s$ is an extension $u$, said extensions being each provided with a jaw $v$ at its upper end. Extending at right angles to one of the extensions $u$ and parallel with the rods $q$ is a rod $w$, upon the free end of which is secured a transverse head.

Parallel with the brace $i$ and directly beneath the shaft $k$ is a second shaft $l^2$, which projects slightly beyond the brace at one of its ends to receive a gear-wheel 2 and which carries sprocket-wheels 4 and 4', mounted thereon and within the brace. Similar shafts 6 and $6^a$ are journaled transversely of the uppermost brace $7^a$ and the lowermost brace 7, and upon both ends of each shaft are sprocket-wheels, one of each being shown at 9 and $9^a$, the wheels of the opposite ends of the shafts being concealed in the drawings. Mounted at either side of the frame are sprocket-chains 10 and 11, which connect and receive motion from the three sprocket-wheels on their respective sides of the frame. Attached to these chains in any suitable manner is an endless carrier 12. Mounted upon the extending end of the shaft $k$ is a gear-wheel 13, which meshes with the gear-wheel 2 and through the medium of which the shaft $k$ and the gear-wheels 4 and 4' are revolved, carrying with them the chains 10 and 11 and in turn the carrier 12.

Encircling the entire casing $a$, with the exception of the space inclosed by the ring $d$ and the space at the lower side of the casing between the lowermost braces, is a canvas or similar waterproof covering 14, which prevents the fruit from rolling from the casing in its descent to the ground.

The operation of my device is as follows: My fruit-picker is first moved under the tree from which it is desired the fruit shall be picked. After being placed in this position the frame $a$ is moved in the swivel of the support $f$ in such a manner as to allow the fruit to fall into the opening of the canvas covering at the ring $d$, and when the fruit has thus fallen into the ring $d$ it will be allowed to pass beneath the jaws $t$ in such a manner as to allow its stem to fall between the jaws $v$. After the fruit has been allowed to assume this position the handle $m$ is revolved. This will give motion to the shaft $k$ and to the cranks $l$ and $l'$, and as these cranks are revolved the wires $n$ and $n'$ are alternately drawn upon and relaxed. When the wire $n'$ is drawn upon, the wire $n$ will be relaxed, and this will cause the jaws $t$ and $v$ to come together, the jaws $t$ grasping the fruit by the stem and the jaws $v$ engaging the upper part of the fruit. At the same time the rod $w$ will pass between the jaws $t$ and $v$ and will engage the stem of the fruit and cut it in two, thereby allowing the fruit to fall down upon the carrier 12, by means of which it will be lowered to the bottom of the frame. When the fruit reaches the lower extremity of the frame $a$, it will fall through an opening in the canvas covering and into a receptacle placed for this purpose.

Having thus described my invention, what I claim is—

1. An apple-picker comprising a support, a frame mounted upon the support, a covering for the frame, cranks mounted in the frame, fruit-picking mechanism secured to the frame and actuated by the cranks and a carrier mounted within the frame to receive and convey the fruit.

2. An apple-picker comprising a support, a frame mounted upon the support, cranks mounted transversely of the frame, wires mounted within the frame and having connection at one end with the cranks and at the other end with fruit-picking mechanism, said fruit-picking mechanism comprising two sets of jaws to hold the fruit and a breaker to operate in connection with the jaws, a carrier mounted within the frame and adapted to receive and convey the fruit, shafts having sprocket-wheels, mounted transversely of the frame to receive the carrier, and means for revolving said shafts, when the picking mechanism is operated.

3. An apple-picker comprising a support, a frame mounted upon this support, said frame comprising rectangular braces connected one with another, at their corners, a crank-shaft mounted transversely of the frame, wires connected to the cranks of the shaft extending longitudinally of the frame, a ring secured to the frame adjacent one of its ends, rods slidably mounted upon the ring, a pair of jaws secured to each of said rods for holding the fruit, a breaker secured between the jaws of one of the rods, a carrier mounted within the frame, sprocket-chains secured to either side of the carrier, shafts having sprocket-wheels mounted transversely of the frame to receive the sprocket-chains and a means for revolving the shafts when the crank-shaft is revolved.

In testimony whereof I affix my name in the presence of two witnesses.

WILLIE H. SCHROEDER.

Witnesses:
  G. H. SHERWOOD,
  A. P. CHILD.